United States Patent
Fuwa

(10) Patent No.: US 7,417,388 B2
(45) Date of Patent: Aug. 26, 2008

(54) RUNNING MACHINE WITH WHEELS

(75) Inventor: Toshio Fuwa, Nisshin (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 161 days.

(21) Appl. No.: 11/512,093

(22) Filed: Aug. 30, 2006

(65) Prior Publication Data

US 2007/0052377 A1  Mar. 8, 2007

(30) Foreign Application Priority Data

Sep. 2, 2005  (JP) ............................. 2005-254857

(51) Int. Cl.
*H02P 3/00* (2006.01)
(52) U.S. Cl. ............. 318/139; 318/400.07; 318/400.15; 361/1; 361/23
(58) Field of Classification Search ................ 318/139, 318/400.07, 400.15; 361/1, 23
See application file for complete search history.

(56) References Cited

U.S. PATENT DOCUMENTS

| | | | | |
|---|---|---|---|---|
| 5,248,007 A | * | 9/1993 | Watkins et al. | ............. 180/9.32 |
| 5,701,965 A | * | 12/1997 | Kamen et al. | ................. 180/7.1 |
| 6,965,206 B2 | * | 11/2005 | Kamen et al. | ................. 318/139 |
| 2002/0121394 A1 | * | 9/2002 | Kamen et al. | ................. 180/41 |
| 2003/0141832 A1 | * | 7/2003 | Field et al. | .................. 318/139 |
| 2007/0156315 A1 | * | 7/2007 | Raab et al. | ..................... 701/38 |

FOREIGN PATENT DOCUMENTS

| | | |
|---|---|---|
| JP | 63-305082 | 12/1988 |
| JP | 4-201793 | 7/1992 |
| WO | WO 02/30730 | 4/2002 |

* cited by examiner

*Primary Examiner*—Rita Leykin
(74) *Attorney, Agent, or Firm*—Finnegan, Henderson, Farabow, Garrett & Dunner, LLP

(57) ABSTRACT

A running machine that can prevent overturning of a body in the case of occurrence of an abnormality is provided. The running machine substantially supports the body with coaxially arranged drive wheels, and can drive while maintaining the balance of the body. A control module of the machine comprises a stabilization controller that computes a first torque command for maintaining the balance of the body and a travel controller that computes a second torque command for driving the running machine. A sum of the first torque command and the second torque command is inputted into the motors. When an abnormal condition detector detects occurrence of an abnormal condition, a safe mode controller prohibits the travel controller from outputting the second torque command. This could enable all torque that the motors can output to be used to maintain the balance of the body when occurrence of an abnormal condition is detected. Therefore, even when occurrence of an abnormal condition is detected, the balance of the body can be maintained. Or even if the balance cannot be maintained, it is possible to extend duration before overturning. During the duration, by pulling out a safety wheel from the body, for instance, overturning of the body can be prevented.

5 Claims, 5 Drawing Sheets

RUNNING MACHINE WITH WHEELS

CROSS REFERENCE TO RELATED APPLICATION

This application claims priority to Japanese Patent Application No. 2005-254857 filed on Sep. 2, 2005, the contents of which are hereby incorporated by reference into the present application.

BACKGROUND OF THE INVENTION

1. Field of the Invention

The present invention relates to a running machine with wheels coaxially arranged on a body substantially supporting it.

2. Description of the Related Art

A running machine with wheels coaxially arranged on a body substantially supporting it has been developed. A body of such a running machine is tiltable around a rotation axis of the wheels and the running machine runs while the gravity center of the body is higher than the rotation axis. Thus, the running machine needs to control the coaxially arranged wheels so as to maintain the tilt angle of the body in a predetermined angle range. Specifically, to maintain the tilt angle of the body in a predetermined angle range, adequate torque is given from a motor to the wheels. In the following, such a running machine maybe simply referred to as the machine. Maintaining the tilt angle of the body of a running machine in a predetermined angle range maybe simply referred to as "maintaining the body balance". In addition, wheels to be given torque maybe referred to as drive wheels.

It is important that the machine moves along an intended path. To this end, in the machine, torque not only for maintaining the body balance but also for driving the machine along an intended path is given from a motor to drive wheels. Consequently, the machine can run to an intended destination, while maintaining the body balance.

Because the machine can run while being substantially supported by the coaxially arranged drive wheels, the machine has the benefits of having compact configuration as a whole and having a small turning circle. The machine is convenient to move luggage or people in a narrow space.

BRIEF SUMMARY OF THE INVENTION

If an abnormal condition related to running of the machine occurred, the machine may not maintain the body balance. Thus, the technique to cope with the abnormal condition related to running is demanded in the machine.

The publication (PCT International Publication No. WO2002/030730) discloses a running machine for decelerating body speed before the body falls down when occurrence of an abnormal condition is detected.

The running machine disclosed in the publication gradually decelerates a target speed of the machine when occurrence of an abnormal condition is detected. Finally, the target speed will be set to zero. In other words, if occurrence of the abnormal condition is detected, the machine will slow down and stop. The running machine disclosed in the publication has 2 substantially same control systems that are connected in parallel so as to reliably control the machine when occurrence of abnormality is detected. If an abnormal condition occurs in either one of the control systems, other control system that is normally functioning can control the machine so as to slow it down and stop it. In other words, the running machine disclosed in the publication has so-called redundant control systems. This could gradually decelerate the machine to stop it by using other control system that is normally functioning, in case of an abnormal condition in either one of the control systems.

In the technique disclosed in the above publication, if an abnormal condition occurs in one of the control systems, the running machine can be gradually decelerated to stop by using other control system. However, if an abnormal condition occurs in a motor (e.g., an electric motor) or an amplifier that supplied electric current to the motor, the supplied current may not be possible to drive the machine as intended way. In the case the abnormal condition occurs in the motor or motor amplifier, it will be difficult for even redundant control systems to decelerate the machine while maintaining the body balance.

Thus, there is a need for the technique to prevent a rollover without control for gradual deceleration of the running machine, even if an abnormal condition occurs in any part other than two systems provided redundantly, such as a motor or a motor amplifier and the like.

For the running machine to drive along an intended path while maintaining the body balance, a controller needs to output to the motor both a torque command to maintain the body balance (referred to as a first torque command) and a torque command to drive the machine along an intended a path (referred to as a second torque command). The second torque command also includes other torque command to drive the machine at intended speed/acceleration. In fact, a total torque command that is a sum of the first and second torque commands is outputted to the motor.

It is often impossible to accurately estimate how much capability of the running machine would be damaged due to occurrence of abnormality. Suppose, for instance, that an abnormal condition occurred in the motor and its maximal torque the motor could output decreased. Even if a controller of the machine outputs a total torque command to the motor in this state, the motor may not be able to generate torque corresponding to the total torque command. In other words, even though occurrence of the abnormal condition of the motor could be detected, it would be unknown whether the machine could continue to run while maintaining the body balance.

Since a total torque command is a sum of the first and the second torque commands, a part of the torque outputted by the motor is used not only for maintaining the body balance but also for keeping the machine running. Therefore, in the event of an abnormal condition, the motor might be able to generate torque only for maintaining the body balance (torque corresponding to the first torque command) even if it could not generate torque corresponding to the total torque command. Otherwise, the motor might be able to generate torque that is useful to delay a rollover of the body although it cannot generate enough torque to maintain the body balance. Hence, even when it is unknown how much the capability of the running machine would be damaged due to occurrence of abnormality, if a duration before the body topples over could be extended, a rollover could be prevented by taking a measure during the duration, for example, to pull out the member supporting the body to the grounds.

The running machine according to the present invention stops output of a second torque command if occurrence of an abnormal condition related to running of the machine is detected. In other words, if occurrence of an abnormal condition is detected, only a first torque necessary for maintaining the body balance is outputted to the motor. This could enable all the torque outputted by the motor to be dedicated to maintain the body balance. As a result, even if it is unknown how much the capability of the running machine would be damaged due to occurrence of an abnormal condition, it would be possible to avoid a rollover of the body, or extend a duration before a rollover occurs, by utilizing all of the remaining capability. If the duration before the body topples over could be extended, the rollover could be prevented by taking a measure for the duration to pull out the body supporting member therefrom.

Even when output of a second torque command is stopped, the running machine will not make a sudden stop because of action of inertial force. The controller of the machine outputs to the motor a first torque command to maintain the balance of the body of the machine that continues to run due to inertia. The stop of output of the second torque command intends not to provide the machine with torque for aggressively driving along an intended path at intended speed, which does not mean that the machine is abruptly stopped. While the machine is running due to inertial, torque the motor can output is used only for maintaining the body balance.

While control for maintaining the body balance is in effect, drive wheels rotate so as to maintain the body balance. The controller of the machine outputs to the motor a torque command to maintain the body balance (the first torque command), and not a torque command to aggressively drive the machine along an intended path at intended speed (the second torque command). Therefore, angle of rotation of the drive wheels (that is, a position of the running machine) is not under control. Consequently, a position of the machine may vary in an allowable range.

The running machine according to the present invention comprises a body, drive wheels coaxially arranged on a common rotation axis to arrange the body at a predetermined position, and a motor for applying torque to the drive wheels. The body can be tilted around the common rotation axis. The machine also comprises a first controller, a second controller, an abnormal condition detector, and a safe mode controller. The first controller outputs to the motor a first torque command to maintain the tilt angle of the body in a predetermined angle range. While the tilt angle of the body is maintained in the predetermined angle range, the gravity center of the body is higher than the common rotation axis. In other words, the first controller outputs to the motor the first torque command to maintain the body balance. The second controller outputs to the motor a second torque command to drive the machine along an intended path. The abnormal condition detector detects occurrence of an abnormal condition related to running of the machine. The safe mode controller prevents the second controller from outputting the second torque command when the abnormal condition detector detects occurrence of an abnormal condition. "An intended path" means that data on a preset path is given in advance to the machine or that an operator provides the machine with a path real time by way of an input device such as a joystick and the like.

The first controller and the second controller may be implemented as separate units or as one unit capable of executing both of processes to be done by the first controller and those to be done by the second controller. In the latter case, for instance, one computer may execute a program describing the processes to be done by the first controller and a program describing the processes to be done by the second controller independently, or by switching them over time.

The abnormal condition detector judges occurrence of an abnormal condition related to running of the machine, as described below, for instance. The abnormal condition detector judges that abnormality has occurred when it detects that a sensor continues to output a certain value for a certain duration even though control for maintaining the body balance is in effect. Or, the abnormal condition detector may judge that an abnormal condition has occurred, when at least one of the rotating speed of drive wheels, the tilt angle of the body around the rotation axis, and the size of a torque command is out of the predetermined range. Or, the abnormal condition detector judges that an abnormal condition has occurred when output of an encoder for detecting the rotation angle of wheels exceeds a predetermined range or when temperature of the motor exceeds a predetermined range. Or it may judge occurrence of abnormality when a gear of the drive train is in abnormal condition. Furthermore, an acceleration sensor for detecting acceleration vertical to the body is provided, and the abnormal condition detector may judge occurrence of abnormality when an output value of the acceleration sensor exceeds a predetermined range. Thus, in other words, "an abnormal condition detector for detecting occurrence of an abnormal condition related to running of the machine" refers to a device that is provided in the running machine and detects that at least any of an output value of sensors necessary for controlling running while maintaining the body balance and/or torque commands to be calculated inside the controller exceeds a preset allowable range.

The running machine described above has a first controller that outputs to the motor a first torque command to maintain the body balance and a second controller that outputs to the motor a second torque command to drive the machine along an intended path. When the abnormal condition detector detects occurrence of an abnormal condition related to running of the machine, the safe mode controller prevents the second controller from outputting a second torque command. This could enable all torque that the motor can output to be given to the drive wheels as torque only for maintaining the body balance in the case that occurrence of an abnormal condition related to running is detected.

According to the running machine of the present invention, even if it is unknown how much the capability of the machine would be affected by occurrence of an abnormal condition, the motor can provide the drive wheels with only torque to maintain the body balance in the case of occurrence of abnormality. In other words, the running machine of the present invention operates only to maintain the body balance if occurrence of an abnormal condition is detected. This could allow torque that the motor can output to be dedicated to maintain the body balance. This would increase the possibility that the body balance could be maintained. This would increase the possibility that a duration before the body topples over could be extended even if the body balance could not be maintained. If the duration before a rollover could be extended, it would be possible to take such a fall-prevention measure to pull out the body supporting member during the duration, which could consequently prevent overturning of the body.

Preferably the body supporting member is capable of being moved up and down with respect to the body. Moved downward and grounded, the support member can prevent the body from falling down. Such a support member may be a rod such as kickstand of a motorcycle or something like a landing gear that has a wheel attached to the tip.

The support member travels upward with respect to the body during normal running (running state without detecting occurrence of an abnormal condition). This prevents the support member from hampering running.

It is preferable that the support member moves to down position at first speed when occurrence of abnormality is detected and at second speed when the machine stops running, where the first speed is faster than the second speed.

During normal running of the machine, the support member is moved to up position. When the machine stops running while no abnormality is detected, the support member slowly moves to down position. As the support member slowly moves to down position, the body is prevented from disturbance due to reaction of motion of the support member. The travel speed of the support member moving to down position when no abnormality is detected is referred to as the second speed.

On the one hand, in the case of occurrence of abnormality, there is the risk that the body might be overturned. Thus, the support member moves to down position more rapidly than normal stop. The support member promptly moves to down position where it can support the body to the ground, before the body is overturned, which could prevent overturning of the body. The travel speed of the support member moving to down position when abnormality is detected is referred to as the first speed.

Preferably, after the support member moves to down position, the first controller may change the first torque command to a third torque command to tilt the body to the direction in which the support member approaches to the ground. The third torque command may be a preset value.

In control for maintaining the body balance, feedback control based on the tilt angle of the body is under way. Even if the drive wheels can no longer be feedback controlled normally, torque that has been preset may possibly be outputted to the motor. If the motor could run according to a preset torque command, when occurrence of an abnormal condition is detected, the first controller outputs to the motor the third torque command described above and the body could be surely tilted to the direction in which the support member approaches to the ground. Consequently, the body would support at more than 2 points by coaxially arranged drive wheels and the support member. This could reliably prevent the body from overturning.

According to the present invention, it is possible to provide a running machine that may prevent overturning of a body without controlling for gradual deceleration of the running speed in the case that occurrence of an abnormal condition is detected.

DETAILED DESCRIPTION OF THE INVENTION

Technical features of embodiment will be described below.

Preferably, the running machine has a pair of motors. One of the motors may apply torque to the corresponding drive wheel independently from the other motor. According to the technical feature, if abnormality occurs in either one of the motors, duration before the body topples over may be more reliably extended by the other motor that is functioning normally.

Figure 1:
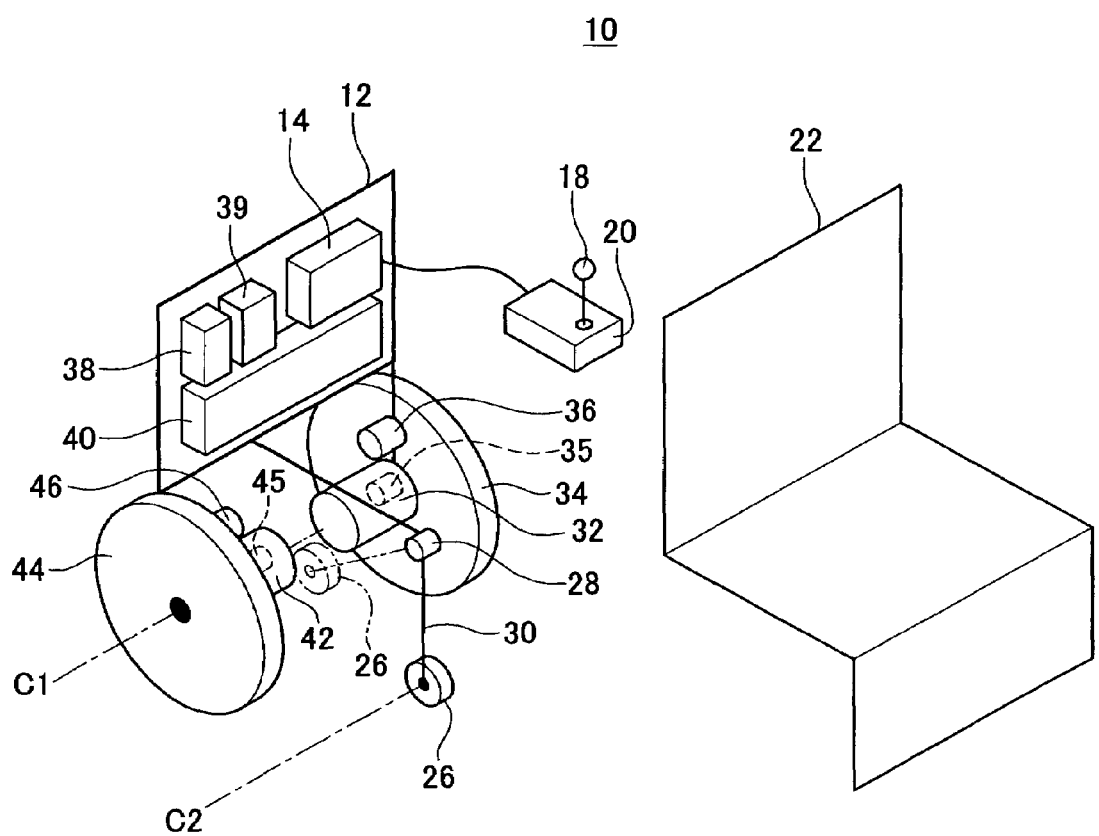
FIG. 1 is a schematic view of a running machine of the embodiment.

The preferable embodiment of the present invention will be described in detail with reference to the drawings. FIG. 1 is a schematic view of a running machine 10. The running machine 10 comprises a body 12, a first drive wheel 34, a second drive wheel 44, and a safety wheel 26 each provided in the body 12. The first and second drive wheels, 34, 44 can rotate around a first axis C1 (a common rotation axis).

The safety wheel 26 is supported at one end of a safety wheel support member 30 so that it can rotate around a second axis C2. The other end of the safety wheel support member 30 is connected to the body 12 by way of a safety wheel adjuster 28. The safety wheel adjuster 28 moves the safety wheel 26 with the wheel support member 30 to a position indicated by the two-dotted chain line in FIG. 1, if the machine 10 is controlled so that the body 12 is grounded only with the first and second drive wheels 34, 44. The condition that the body 12 is in contact with the ground only with the drive wheels 34, 44 can be stated by the expression that "the body 12 is balancing". Furthermore, maintaining the condition that the body 12 is balancing is expressed by "maintaining the balance of the body 12". In addition, the condition that the safety wheel 26 is moved to the position indicated by the two-dotted chain line in FIG. 1 is referred to as "the safety wheel 26 is at two-wheel grounded position".

On the one hand, when the body 12 is grounded with the drive wheels 34, 44 and the safety wheel 26, the safety wheel 26 is moved to a position (down position) indicated by a solid line in FIG. 1. The condition that the body 12 can be grounded with the first and second drive wheels 34, 44 and the safety wheel 26 with the safety wheel 26 moved to the down position, is referred to as "the safety wheel 26 is at three-wheel grounded position".

A seat 22 on which a person can sit is provided in the running machine 10. Thus, the machine 10 can run with someone riding.

The machine 10 comprises a first motor 32 for driving the first drive wheel 34, a second motor 42 for driving the second drive wheel 44, and a battery module 40 that supplies electric power to both motors 32, 42. The machine 10 is such configured that the motors 32, 42 are provided for the respective drive wheels 34, 44 and each of the respective drive wheels 34, 44 can be driven independently. The first motor 32 also has a first temperature sensor 35 for detecting overheating of the first motor 32. The motor 32 may not output maximum torque as designed if it overheats. Similarly, the second motor 42 has a second temperature sensor 45.

The running machine 10 also comprises a control module 14 for controlling the first motor 32, the second motor 42, and the safety wheel adjuster 28, and an operation module 20 to be operated by a passenger of the running machine 10. The control module 14 controls the first motor 32, the second motor 42, and the safety wheel adjuster 28 in response to an operation that a passenger of the machine 10 provides to the operation module 20. In addition, the control module 14 also controls for maintaining balance of the body 12.

The machine 10 has a gyro 38 for detecting the tilt angler rate of the body 12, an acceleration sensor 39 for detecting vertical acceleration of the machine 10, a first encoder 36 for detecting the rotation angle of the first drive wheel 34, and a second encoder 46 for detecting the rotation angle of the second drive wheel 44. The tilt angler rate of the body 12 is, in other words, the angular rate of the tilt angle of the body 12. The tilt angle of the body 12 represents the rotation angle around the first axis C1 of the body 12 by inclination to the vertical direction. In the embodiment, it is assumed that the condition in which the gravity center of the body 12 is positioned vertically above the first axis C1 is a reference of the tile angle (zero tilt angle). In addition, the direction in which the body 12 tilts to the safety wheel 26 as shown by the solid line in FIG. 1 shall be a positive direction of the tilt angle. The gravity center of the body 12, in the case that a passenger is present on the body 12, represents the gravity center taking mass of the passenger into consideration.

The rotation angle of each drive wheel 34, 44 means a relative rotation angle of each drive wheel 34, 44 to the body 12.

The acceleration sensor 39 detects acceleration of the body 12 in the vertical direction. When output changes of the acceleration sensor 39 exceed an allowable range, it can be judged that the machine 10 is running on unexpected rough road (bumpy road).

The operation module 20 is provided with a control lever 18. The control lever 18 is an input device for a passenger to adjust the running speed or running direction of the machine 10. By adjusting operation amount of the control lever 18, the passenger can drive the machine 10 along an intended path and at intended speed. In response to an operation given to the control lever 18, the machine 10 can advance, stop, retreat, turn left, turn right, make a counter-clockwise turning, and make a clockwise turning.

Figure 2:
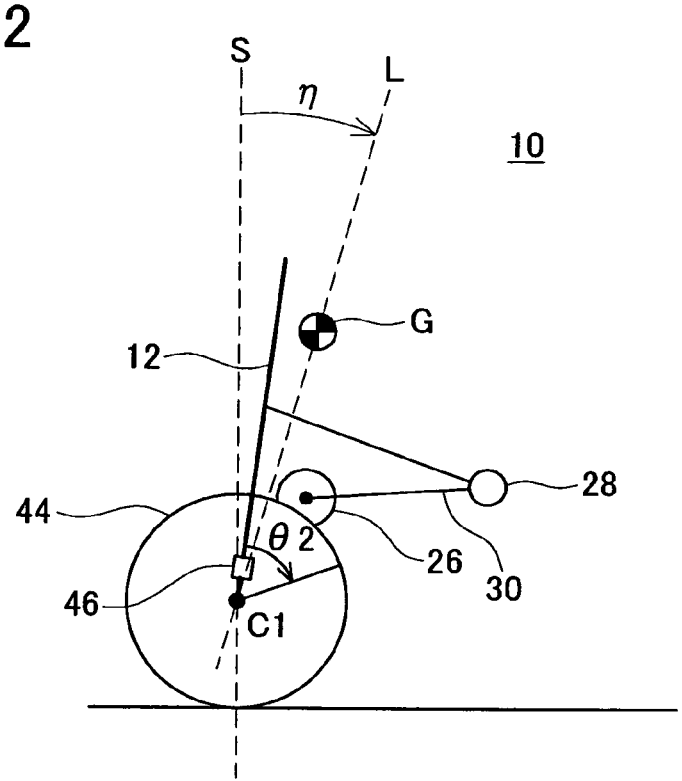
FIG. 2 is a schematic view of a running machine that grounded only with drive wheels.

FIG. 2 schematically shows the condition in which the machine 10 is grounded only with both drive wheels 34, 44. In other words, FIG. 2 shows the condition in which the body 12 is balanced. The condition is referred to as a two-wheel grounded condition. As shown in FIG. 2, in the condition in which the body 12 is balanced, the safety wheel 26 is moved upward to inside the body 12 by the safety wheel adjuster 28 and the safety wheel support member 30. In other words, the safety wheel 26 shown in FIG. 2 is at two-wheel grounded position.

The symbol θ2 indicated in FIG. 2 represents the rotation angle of the second drive wheel 44. The rotation angle θ2 of the second drive wheel 44 is detected by the second encoder 46 provided in the body 12. The rotation angle of the first drive wheel (not shown in FIG. 2) may be represented by the symbol θ1. The rotation angle θ1 of the first drive wheel 34 is detected by the first encoder 36 (not shown in FIG. 2) provided in the body 12.

In FIG. 2, the symbol G represents the gravity center of the body 12. The symbol η represents the tilt angle of the body 12. The tilt angle η of the body 12 is the angle between the straight line L (a straight line connecting the first axis C1 with the gravity center G of the machine 10) and the vertical line S passing through the first axis C1. The condition in which the gravity center G is positioned on the vertical line S will be a reference of the tilt angle (zero tilt angle), and the direction in which the body 12 tilts to the safety wheel 26 as indicated by the solid line in FIG. 1 will be a positive direction of the tilt angle. The tilt angle η is obtained by integrating angular rate dη detected by the gyro 38 provided in the body 12 (not shown in FIG. 2).

As shown in FIG. 2, the gravity center G of the body 12 is higher than the first axis C1 when the body 12 is balanced. In addition, the tilt angle η of the body 12 may vary around the first axis C1. Thus, as shown in FIG. 2, if the tilt angle η is a positive value, the body 12, unless it is controlled, will tilt and topple over to the right in FIG. 2 due to moment around the gravity center G caused by gravity force. If the tilt angle η is a negative value, the body 12 will tilt and topple over down to the left in FIG. 2 if it is not controlled at all.

The control module 14 of the machine 10 controls the motors 32, 42 that provide the drive wheels 34, 44 with torque so that the body 12 does not topple over. To be specific, it controls to advance the drive wheels 34, 44 in the direction in which the body 12 tilts. Then, due to motion of the machine 10, the moment acts so as to return the gravity center G to the vertical upper area of the first axis C1. The control module 14 can maintain the balance of the body 12 by always executing the control descried above so that the tilt angle η of the body 12 is within a predetermined angle range. More preferably, the control module 14 controls the motor 32, 42 so that the tile angle η of the body 12 is almost zero.

In other words, "the body is balancing" means that the member supporting the body to the ground plane is substantially only drive wheels coaxially arranged on a common axis, torque is adequately allotted to the drive wheels, and the body is thus maintained in the condition that the tilt angle to the vertical direction does not increase beyond the predetermined angle range.

Figure 3:
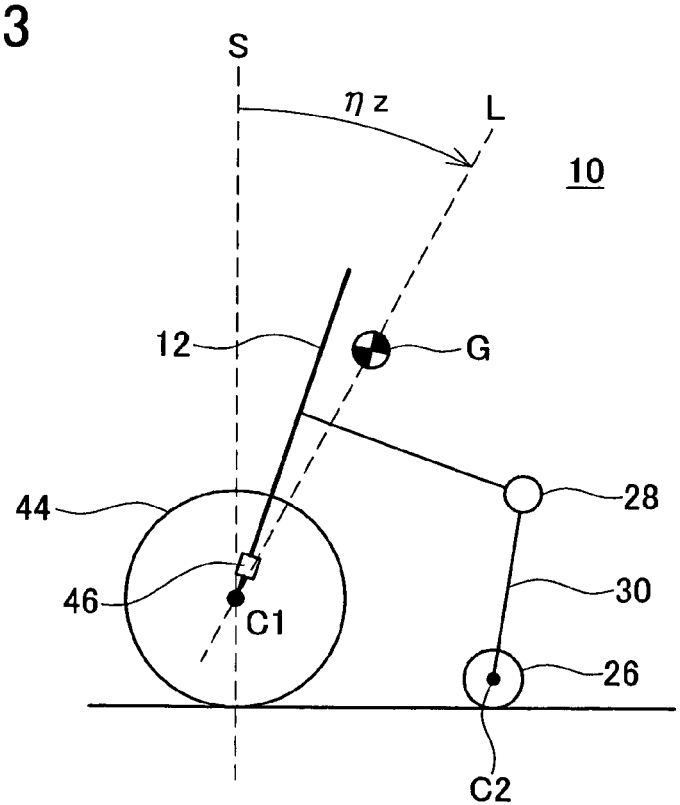
FIG. 3 is a schematic view of a running machine that grounded with drive wheels and safety wheels.

FIG. 3 schematically shows the condition in which the machine 10 is in contact with the ground with both drive wheels 34, 44 and the safety wheel 26. The condition is referred to as a three-wheel grounded condition. As shown in FIG. 3, in the three-wheel grounded condition, the safety wheel 26 is moved lower than the two-wheel ground position by the safety wheel adjuster 28 and the safety wheel support member 30. In other words, if the machine 10 is at the three-wheel grounded condition, the safety wheel 26 is moved to the three-wheel grounded position (the down position) by the safety wheel adjuster 28.

Then, since a point of the gravity center G projected to the ground is in the area comprised of the ground points of the drive wheels 34, 44 and that of the safety wheel 26, the body 12 will not topple over. In other words, the body 12 will not overturn because it is supported to the ground at the ground points of the drive wheels 34, 44 and at the ground point of the safety wheel 26 (these three ground points are not aligned on one line).

The machine 10 can drive, turn and stop, while maintaining the three-wheel grounded condition. Now, ηz in FIG. 3 represents the tilt angle of the body 12 when the machine 10 keeps the three-wheel grounded state. The angle ηz may be referred to as an expected grounding tilt angle of safety wheel. The tilt angle of the body 12, when the machine 10 keeps the three-wheel ground state in reality, may vary depending on inclination of the ground surface, irregularity of the ground surface and the like, it may not necessarily be the expected grounding tilt angle of safety wheel ηz at any given time.

Figure 4:
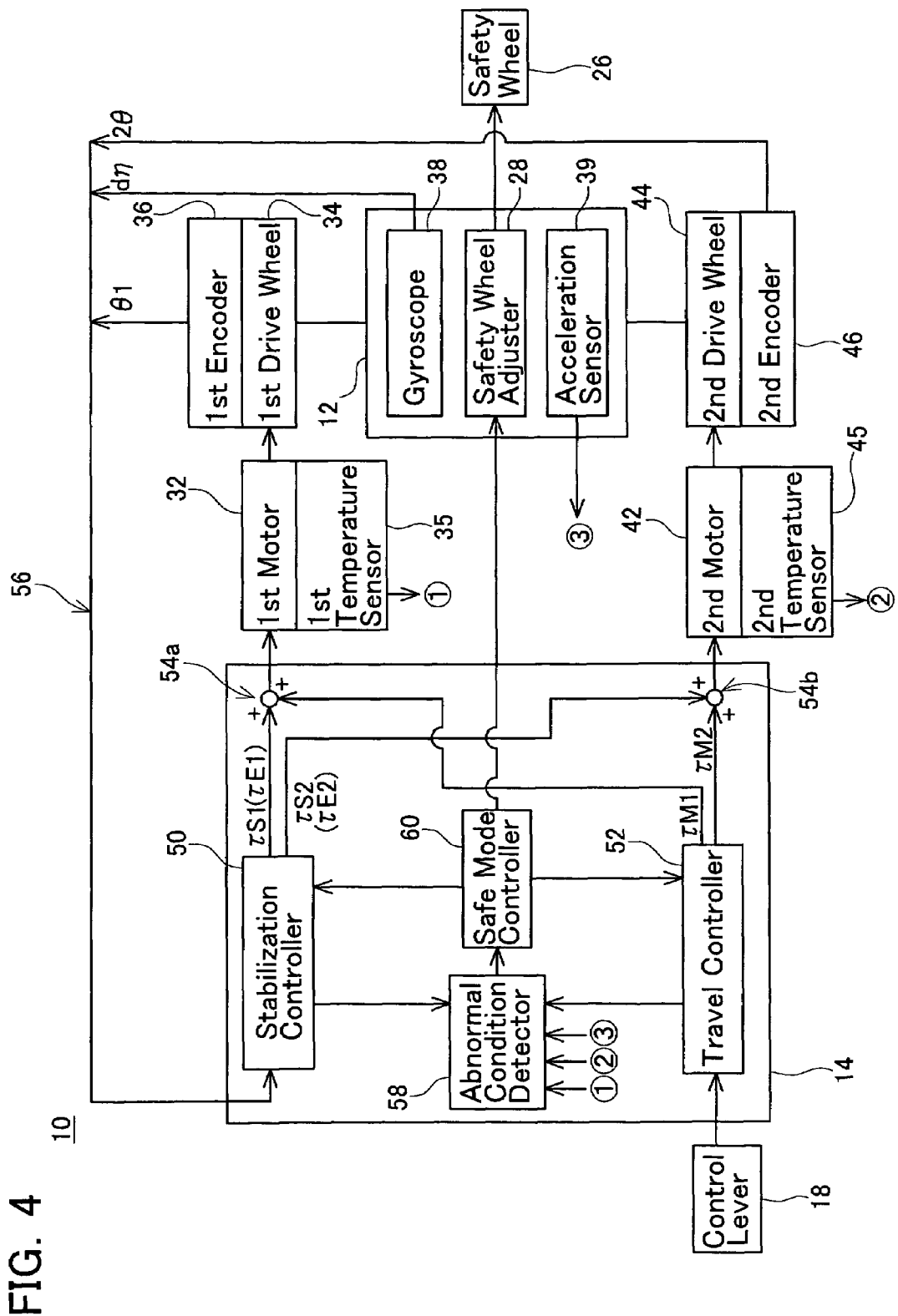
FIG. 4 is a block diagram of a control system of a running machine.

Next, the control system of the running machine 10 will be described. FIG. 4 is a block diagram of a control system of the running machine 10. Although the control module 14 controls the machine 10 in various aspects on the machine 10 such as adjustment of the reclining angle of a passenger seat 22, for instance, FIG. 4 only shows drive-related parts.

The control module 14 comprises a stabilization controller 50, a travel controller 52, an abnormal condition detector 58, and a safety mode controller 60.

The stabilization controller 50 acquires the angular rate ηd of the body 12 from the gyro 38 provided in the body 12. It also acquires the rotation angle θ1 of the first drive wheel 34 from the first encoder 36 provided in the body 12. Furthermore, it acquires the rotation angle θ2 of the second drive wheel 44 from the second encoder 46 also provided in the body 12.

The stabilization controller 50 calculates the tilt angle η of the body 12 by integrating the acquired tilt angular rate dη of the body 12. It also calculates the rotation angular rates dθ1 and dθ2 of the drive wheels 34, 44 by differentiating the rotation angles θ1, θ2 of the drive wheels 34, 44.

The stabilization controller 50 calculates torque that the drive wheels 34, 44 should generate in order to maintain the balance of the body 12, as illustrated in FIG. 2, based on the tilt angle η and tilt angular rate dη of the body 12, and the rotation angles θ1, θ2 and rotation angular rates dθ1, dθ2 of the drive wheels 34, 44. Then, the stabilization controller 50 outputs to the first motor 32 and the second motor 42 a stabilization torque command corresponding to the calculated torque. The stabilization torque command to be given to the first motor 32 by the stabilization controller 50 is referred to as the symbol τS1. Similarly, the stabilization torque command to be given to the second motor 42 by the stabilization controller 50 is referred to as the symbol τS2. Meanings of (τE1) and (τE2) as shown in FIG. 4 will be described later.

The stabilization controller 50 acquires tilt angular rate dη of the body 12 and the tilt angles θ1, θ2 of the drive wheels 34, 44 and configures the feedback control system that outputs a stabilization torque command to the motors 32, 42. The line as indicated by symbol 56 in FIG. 4 represents a feedback loop.

On the other hand, the travel controller 52 in the control module 14 calculates torque that the motors 32, 42 should generate to drive the machine 10 along a path that a passenger intends and at intended speed, based on signals from the control lever 18 operated by the passenger. The travel controller 52 outputs to the first motor 32 and the second motor 42 a drive torque command corresponding to the calculated torque. τM1 that the travel controller 52 outputs is the drive torque command to the first motor 32, while τM2 is the drive torque command to the second motor 42.

An adder 54a adds the stabilization torque command τS1 and the drive torque command τM1 and outputs it to the first motor 32. An adder 54b adds the stabilization torque command τS2 and the drive torque command τM2 and outputs it to the second motor 42. The respective motors 32, 42 outputs torque corresponding to a final total torque command that is a sum of the stabilization torque command and the drive torque command. The torque outputted by the motors 32, 34 is respectively transmitted to the drive wheels 34, 44.

The travel controller 52 calculates the drive torque command τM1, τM2 based on operation amount of the control lever 18 and outputs them to the motors 32, 42.

On the other hand, the stabilization controller 50 calculates the stabilization torque command τS1, τS2 for maintaining balance of the body 12 by feeding back the tilt angular rate dη of the body 12 and the rotation angles θ1, θ2 of the drive wheels 34, 44, and outputs them to the motors 32, 42.

In other words, the stabilization controller 50 of the running machine 10 of this embodiment executes the feedback control to always maintain balance of the body 12, irrespective of the drive torque command τM1, τM2 that the travel controller 52 outputs. In other words, the stabilization controller 50 executes control to maintain the balance of the body 12, considering that a change in the tilt angle η of the body 12 due to the drive torque commands τM1, τM2 are, so to say, as a change caused by disturbance. In this embodiment, construction of the stabilization controller 50 and the travel controller 52 as an independent controller is made possible that the stabilization controller 50 handles a change in the tilt angle η of the body 12 caused by the drive torque command as a kind of disturbance.

The abnormal condition detector 58 provided in the control module 14 monitors respective signals in the stabilization controller 50 and the travel controller 52, and checks if a value of each signal does not exceed a predetermined range. In other words, the abnormal condition detector 58 detects occurrence of an abnormal condition related to running of the machine 10. Here the values of the respective signals indicate, for instance, the operation amount of the control lever 18, the body tilt angular rate dη detected by the gyro 38, the rotation angles θ1, θ2 of the drive wheels 34, 44 detected by the encoders 36, 46, the body tilt angle η calculated in the stabilization controller 50, the rotation angular rates dθ1, dθ2 of the drive wheels 34, 44, the stabilization torque command τS1, τS2 to be calculated in the stabilization controller 50, the drive torque commands τM1, τM2 calculated in the travel controller 52 and the like. The abnormal condition detector 58 may also check values of the rotation angle accelerations ddθ1, ddθ2 of the drive wheels 33, 34 whether or not they exceed a predetermined range. The rotation angle accelerations ddθ1, ddθ2 can be obtained by differentiating the rotation angular rates dθ1, dθ2 of the drive wheels 34, 44 in the stabilization controller 50.

The operation amount of the control lever 18 obtained by the abnormal condition detector 58 and the drive torque commands τM1, τM2 calculated in the travel controller 52 are indicated by arrows extending from the travel controller 52 to the abnormal condition detector 58. In addition, the body tilt angular rate dη, the body tilt angle η, the rotation angles θ1, θ2 of the drive wheels 34, 44, the rotation angler rates dθ1, dθ2 of the drive 34, 44, and the rotation angle accelerations ddθ1, ddθ2 acquired by the abnormal condition detector 58, and the stabilization torque command τS1, τS2 calculated in the stabilization controller 50 are indicated by arrows extending from the stabilization controller 50 to the abnormal condition detector 58 in FIG. 4.

The abnormal condition detector 58 also acquires detected values of the first temperature sensor 35 for detecting temperature of the first motor 32 and of the second temperature sensor 45 for detecting temperature of the second motor 42, and output from the acceleration sensor 39 provided in the body 12. In FIG. 4, the line extending from the first temperature sensor 35 to the symbol "encircled number 1" (hereinafter referred to as (1)) corresponds to (1) from which an arrow extends to the abnormal condition detector 58. In fact, this means that the signal line is connected from the first temperature sensor 35 to the abnormal condition detector 58. Similarly, the symbols "encircled number 2" and "encircled number 3" mean that each signal is connected to the abnormal condition detector 58.

An allowable range is preset for each value acquired by the abnormal condition detector 58, which thus judges occurrence of an abnormal condition when a value of a signal exceeds its allowable range. In addition, the allowable range of each value may widely vary depending on a value of other signal. For instance, the setting shall be such that as a value of vertical acceleration of the body 12 increases, the allowable range of the body tilt angle η decreases. This is because it becomes more difficult to maintain balance of the body 12, as the vertical acceleration of the body 12 increases.

In addition, if a fluctuation margin of the vertical acceleration of the machine 10 exceeds the allowable range, it is estimated that the machine 10 is running on unexpected rough road (bumpy road). In this embodiment, the case in which the fluctuation margin of the vertical acceleration of the machine 10 exceeds the allowable range is also included in the concept of "occurrence of an abnormal condition relating to running of the machine 10".

When it detects occurrence of an abnormal condition related to running of the machine 10, the abnormal condition detector 58 notifies the safe mode controller 60 accordingly. In response to the notification of occurrence of the abnormal condition, the safe mode controller 60 send a command for preventing rollover of the body 12 to the stabilization controller 50, the travel controller 52 and the safety wheel adjuster 28. When occurrence of abnormality is detected, the process that the safe mode controller 60 controls respective equipment is referred to as safe mode process. To be specific, the safe mode controller 60 controls the travel controller 52 so as to prevent it from outputting the drive torque command, and controls the safety wheel adjuster 28 so as to move the safety wheel 26 to a three-wheel grounded position. The safe mode process will be described in detail based on FIG. 5 and FIG. 6 in the following.

Figure 5:
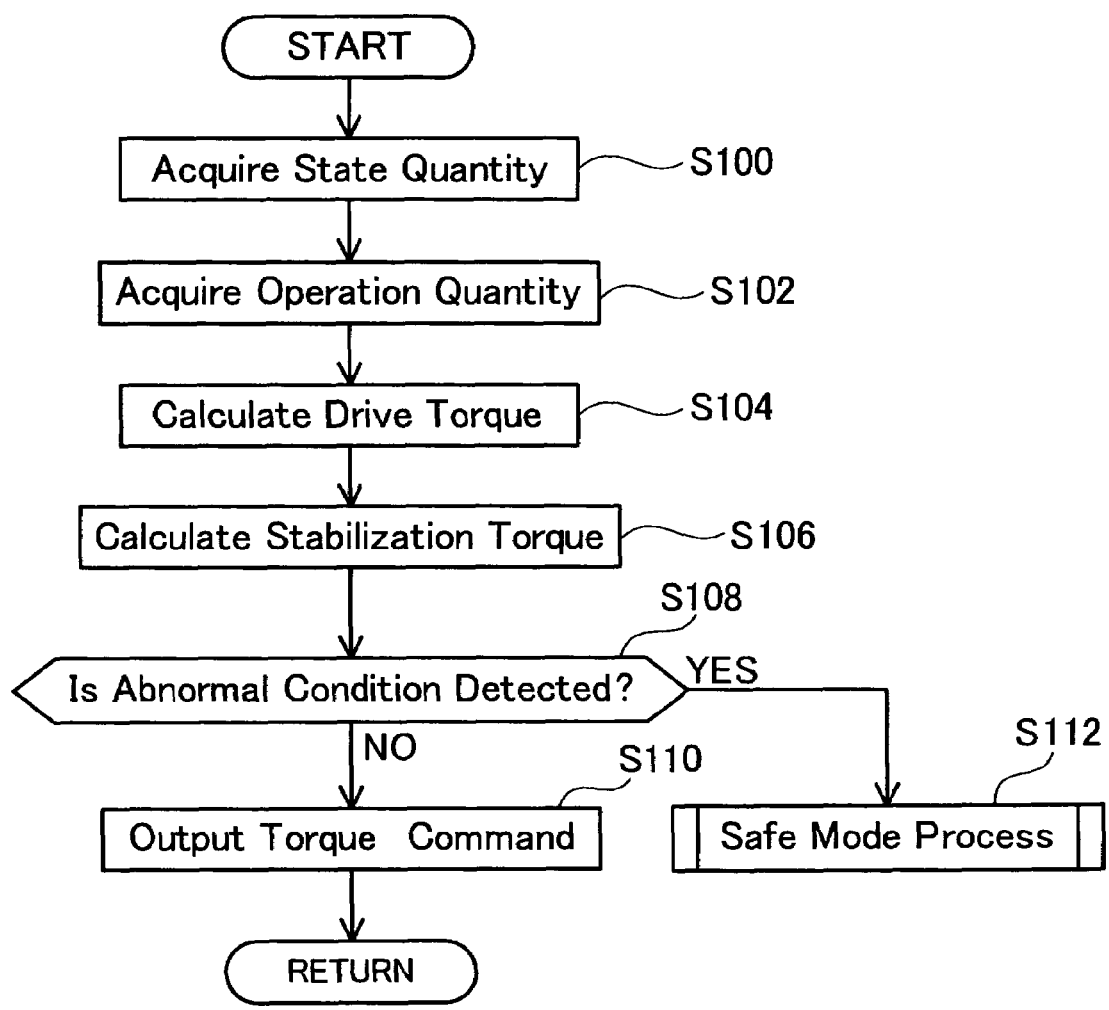
FIG. 5 is a control flow chart of a running machine.

FIG. 5 is a flow chart of the process to be executed in the control module 14 in normal operation (when no occurrence of an abnormal condition is detected).

In normal operation, state quantity related to running of the machine 10 is acquired for every control sampling (Step S100). Specifically, the state quantity refers to the tilt angular rate $d\eta$ of the body 12 detected by the gyro 38 or the rotation angles $\theta1$, $\theta2$ of the drive wheels 34, 44 detected by the encoders 36, 46. In addition, in step S100, the calculation of the tilt angle $\eta$ from the acquired tilt angular rate $d\eta$ and the calculation of the rotation angular rates $d\theta1$, $d\theta2$ or the rotation angular acceleration $dd\theta1$, $dd\theta2$ acquired from the rotation angles $\theta1$, $\theta2$ are also executed. The calculated tilt angle $\eta$, the rotation angular rates $d\theta1$, $d\theta2$ are also included in the "state quantity related to running". In addition, detected values of the temperature sensors 35, 45 acquired by the abnormal condition detector 58 or output from the acceleration sensor 39 provided in the body 12 are also "state quantity related to running". The processes in step S100 are executed by the gyro 38, encoders 36, 46, temperature sensor 35, 45, acceleration sensor 39 and stabilization controller 50.

Next, in step S102, the operation amount to be outputted from the control lever 18 is acquired. Then, in step S104, drive torque commands $\tau M1$, M2 for driving (including circling) the machine 10 are calculated based on the operation amount acquired in step S102. The processes in steps S102 and S104 are executed by the travel controller 52.

Then, in step S106, stabilization torque commands $\tau S1$, $\tau S2$ for maintaining the body 12 balance are calculated based on the state quantities acquired in step S100. The processes in step S106 is executed by the stabilization controller 50 as shown in FIG. 4.

Then, in step S108, it is checked whether a value of each signal is not out of predetermined range. In other words, in step S108, it is checked whether occurrence of an abnormal condition is detected. The process is executed by the abnormal condition detector 58 as shown in FIG. 4. Physical quantities subject to the judgment on abnormality includes the state quantities acquired in step S100, operation amount acquired in step S102, drive torque commands $\tau M1$, $\tau M2$ calculated in step S104, and stabilization torque commands $\tau S1$, $\tau S2$ calculated in steps S106.

If no occurrence of abnormality is detected (step S108: NO), torque commands will be outputted to the respective motors 32, 42 in the next step S110. The torque commands outputting to the first motor 32 is a sum of the stabilization torque command $\tau S1$ and the drive torque command $\tau M2$. The torque command of the second motor 42 is a sum of the stabilization torque command $\tau S2$ and the drive torque command $\tau M2$. Each of motors 32, 42 operates based on the torque command, thus the machine 10 runs along an intended path while maintaining the body 12 balance. The above processes are repeated for every sampling.

On the other hand, in step S108, if occurrence of abnormal condition is detected, the process shifts to step S112. In step S112, safe mode process to prevent rollover of the body 12 is executed. Then, the abnormal condition detector 58 in FIG. 4 notifies the safe mode controller 60 of occurrence of the abnormal condition.

Figure 6:
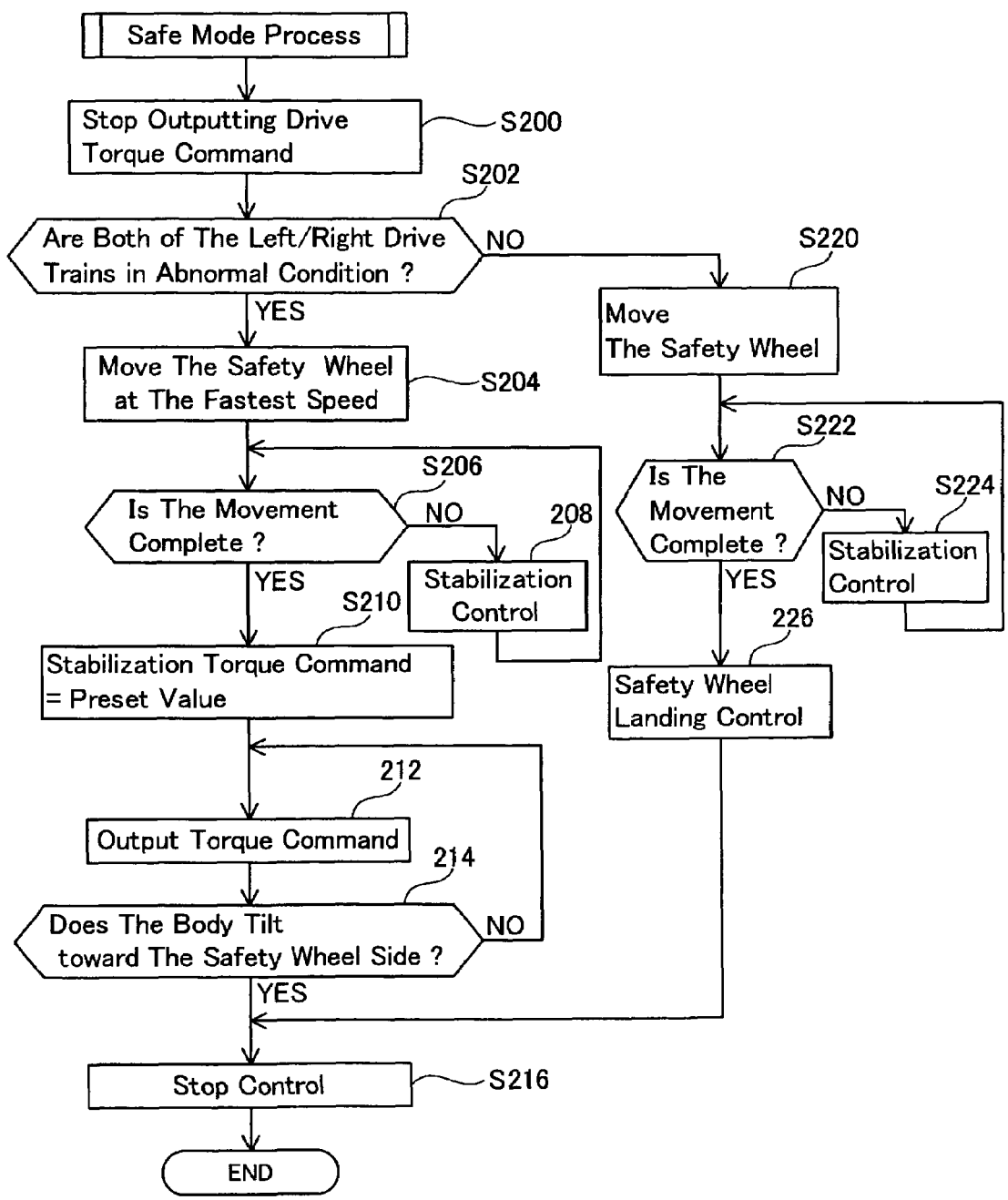
FIG. 6 is a control flow chart of safe mode.

FIG. 6 is a flow chart of the safe mode process. In the safe mode, first of all, output of the drive torque command is stopped in step S200. The process is executed in the safe mode controller 60 in FIG. 4 outputs a command, to the travel controller 52, for preventing output the drive torque command.

Then, in step S202, it is judged whether the detected occurrence of the abnormal condition indicates if both of right and left drive trains are in abnormal condition. This is to be judged by a kind of abnormal condition detected by the abnormal condition detector 58. For instance, it can be judged that the abnormal condition occurs only in the drive train associated with the first drive wheel 34, if only a value of the rotation angular rate $d\theta1$ of the first drive wheel 34 that the first encoder 32 detects is out of the preset allowable range. On the other hand, it can be judged that the abnormal condition occurs in both of the right and left drive trains if values of the rotation angular rates $d\theta1$, $d\theta2$ of the drive wheels 34, 44 are both out of the allowable range.

In addition, if it cannot be determined in step S202 whether the abnormal condition occurs in both right and left drive trains or only in one of the drive train, in order to ensure a safer approach, it is judged that the abnormal condition occurs in both of the right and left drive trains. For instance, an output value from the control lever 18 (see FIG. 4) exceeds a predetermined range, it cannot be determined in which drive train of the right and left wheels the abnormal condition occurs. In such a case, it is judged in step S202 that the abnormal condition occurs in both of the right and left drive trains. In addition, the above judgment is made by the safe mode controller 60 shown in FIG. 4.

If it is judged in step S202 that the abnormal condition occurs in both of the right and left drive trains (step S202: YES), the safety wheel 26 is then moved to the three-wheel grounded position at the fastest speed (second speed) in step S204. In other words, the safety wheel 26 is moved to the down position from the position of the safety wheel 26 indicated by the two-dotted chain line in FIG. 1 at the fastest speed. The process is executed when the safe mode controller 60 sends a command to the safe wheel adjuster 28 in the block diagram of FIG. 4. In addition, "moves the safety wheel 26 to the three-wheel grounded position at the fastest speed (second speed)" means that the second speed is faster than the moving speed (first speed) of the safety wheel 26 in normal operation (while no abnormal condition occurs). In normal operation, when moving the machine 10 from the two-wheel grounded state shown in FIG. 2 to the three-wheel grounded state shown in FIG. 3, the safety wheel 26 moves at slow speed (first speed). This is to prevent the body 12 that maintains the balance from disturbance due to reaction force caused by the motion of the safety wheel 26. Since it is necessary to move the safety wheel 26 downward before the body 12 topples over when occurrence of an abnormal condition is detected, the safety wheel 26 moves to the down position at faster speed (second speed) than that in normal operation.

Next, it is judged in step S206 whether movement of the safety wheel 26 is complete. If the movement of the safety wheel 26 is not complete (step S206: NO), stabilization control takes place in step S208. The stabilization control refers to the processes of steps S100, S106, and S110 shown in FIG. 5. In other words, state quantity is acquired in step S100, a stabilization torque command is calculated in step S106, and the stabilization torque command is outputted to the motor in step S110. If it is judged in step S202 that the abnormal condition occurs in both of the right and left drive trains, control to maintain the body 12 balance is attempted until the safety wheel 26 moves to the three-wheel grounded position. This is expected to have the following effects. In other words, if it is not possible to determine in step S202 whether abnormality occurs in both or only one of the right and left drive trains, it is judged that the abnormality occurs in both of the right and left drive trains to ensure a safer approach. Then, in reality, at least one of the drive trains of the first motor 32 and of the second motor 42 may be normal. If at least one drive train is normal, the stabilization control of step S208 is more likely to maintain the body 12 balance. Or, it is possible to extend the duration before the body 12 topples over. For instance, an output value from the control lever 18 exceeds the predetermined range, the stabilization control of step S208 works effectively.

In addition, in the stabilization process of step S208, it is preferable that a stabilization torque command is calculated and outputted so that the gravity center G of the body 12 is positioned on the vertical line S that passes through the first axis C1 in FIG. 2. If the stabilization controller 50 controls the drive wheels 33, 44 so that the gravity center G is positioned on the vertical line S, the speed of the machine 10 will also be nearly zero and the body 12 can be made least vulnerable to overturning.

If it is judged in step S206 that the movement of the safety wheel 26 is complete (step S206: YES), stabilization torque commands (corresponding to $\tau S1$, $\tau S2$ shown in FIG. 4) outputted by the stabilization controller 50 are changed to the preset torque commands (corresponding to $\tau E1$, $\tau E2$ shown in FIG. 4) in step S210. Then, in step S212, the changed torque commands ($\tau E1$, $\tau E2$ shown in FIG. 4) are outputted to the motors 32, 42.

The preset torque commands ($\tau E1$, $\tau E2$ shown in FIG. 4) are the torque commands to tilt the body 12 toward the safety wheel 26 side. For instance, in the condition as shown in FIG. 2, the preset torque commands ($\tau E1$, $\tau E2$ shown in FIG. 4) are torque to the drive wheels 34, 44 turn anti-clockwise in FIG. 2. When the drive wheels 34, 44 rotate anti-clockwise in FIG. 2, the body 12 tilts to the right (i.e., to the safety wheel 26 side) in FIG. 2. This ensures that the body 12 is tilted toward the safety wheel 26 side. As the processes in steps S210 and S212 can be done without feedback, they can be executed even if output values of the encoders 36, 46 exceed a predetermined range (i.e., it is more likely that the encoders 36, 46 have failed).

Then, in step S214, output of the predetermined torque commands ($\tau E1$, $\tau E2$ shown in FIG. 4) continues until the body 12 tilts toward the safety wheel 26 side (step S214: NO). Then, if it is judged in step S214 that the body 12 tilts toward the safety wheel 26 side (step S214: YES), control is stopped and the safe mode process ends in step S216.

More strictly, "until the body 12 tilts toward the safety wheel 26 side" in step S214 means that until the tilt angle $\eta$ of the body 12 takes a positive value. Referring to FIG. 2 for description, the tilt angle $\eta$ of the body 12 taking a positive value means that the gravity center G is positioned more on the safety wheel 26 side than the line S that passes through the first axis C1 and vertically extending upward. If the gravity center G is positioned closer on the safety wheel 26 side than the line S, the body 12 continues to tilt toward the safety wheel 26 side even if control is stopped. If movement of the safety wheel 26 to the three-wheel grounded position is complete, the body 12 will be in the three-wheel grounded condition, which can prevent overturning of the body 12.

On the one hand, if occurrence of the abnormal condition detected in step S202 is not the abnormal condition on both of the right and left drive trains (step S202: NO), the process will shift to the step S220, moving the safety wheel 26 downward (moving the safety wheel 26 to the three-wheel grounded position). If either one of the drive trains for the right and left wheels works normally (i.e., step S202: NO), stabilization control for maintaining the body 12 balance can continue with only the normally functioning drive train. This can extend duration till the body 12 topples over. Thus, the speed for moving the safety wheel 26 in step S220 may be the traveling speed in normal operation (first speed). This could reduce the effect of the movement of the safety wheel 26 on the tilt angle of the body 12.

For the duration till the movement of the safety wheel 26 is complete (step S222: NO), stabilization control continues in step S224. As the stabilization control in step S224 is same as that in step S208, the description will be omitted. However, in step S224, since either one of the drive trains is normal, it is more likely that continued stabilization control could maintain the body 12 balance. It is also preferred that with the stabilization control process in step S224, the drive wheel in which abnormality was detected is locked (the rotation angle relative to the body 12 is locked), and only the drive train that normally functions is subject to the stabilization control.

If the movement of the safety wheel 26 is complete (Step S222: YES), safety wheel landing control is undertaken in step S226. The safety wheel landing control means the control whereby the safety wheel 26 can land smoothly, by gradually increasing the body tilt angle $\eta$ to the positive direction (toward the safety wheel 26 side). The control can lower impact when the safety wheel 26 lands.

When the safety wheel landing control in step S226 terminates, the control is stopped and the safe mode process ends in step S216.

As described above, based on the flow chart of FIG. 6, if occurrence of an abnormal condition related to running of the machine 10 is detected, overturning of the body can be prevented by executing the safe mode process.

When occurrence of an abnormal condition is detected, the running machine of this embodiment can prevent overturning of the body without having redundant control system. This could be achieved if the stabilization controller that outputs stabilization torque command for maintaining the body balance and the travel controller that outputs the drive torque command for driving the machine along an intended path are configured independently, and output of the drive torque command by the travel controller is stopped when occurrence of an abnormal condition is detected.

Furthermore, when occurrence of an abnormal condition is detected, the safety wheel (with the safety wheel support member) that supports the body to the ground plane can be moved downward at the speed (first speed) faster than the speed in normal operation (second speed), thereby allowing the safety wheel to move to the three-wheel grounded position (the down position) till the body is overturned. By moving the safety wheel to the three-wheel grounded position rapidly before the body is overturned, the body can be put into the three-wheel grounded condition more reliably.

In addition, when the stabilization controller outputs the preset torque command so that the body tilts toward the safety wheel side when occurrence of an abnormal condition detected, the body can be put into three-wheel grounded condition more reliably.

The first axis C1 of this embodiment corresponds to one example of the "common rotation axis" in the claims. The safety wheel 26 and the safety wheel support member 30 correspond to one example of the "support member" in the claims. The "three-wheel grounded position" of this embodiment corresponds to one example of "down position" in the claims.

In addition, the stabilization controller 50 corresponds to one example of the "first controller" in the claims, while the travel controller 52 corresponds to one example of the "second controller". The stabilization torque commands τS1, τS2 outputted by the stabilization controller 50 correspond to one example of the "first torque command" in the claims. The drive torque commands τM1, τM2 outputted by the travel controller 52 correspond to one example of the "second torque command" in the claims.

Furthermore, the preset torque commands (τE1, τE2 as shown in FIG. 4) in the process to be executed in step S210 of FIG. 6 when occurrence of an abnormal condition is detected (the process of changing stabilization torque commands outputted by the stabilization controller 50 (τS1, τS2 as shown in FIG. 4) to preset torque commands (τE1, τE2 as shown in FIG. 4)) correspond to the "third torque command" in the claims.

The embodiment of the present invention have been described in details. However, they are simply exemplary, and do not limit the scope of the claims. The techniques described in the claims may include many variations and modifications of the embodiment described above.

For instance, instead of the control lever 18, a sensor for detecting transition in weight of passengers may be provided. The second torque command may be calculated by the travel controller 52 depending on the variation of weights.

In addition, the stabilization controller 50 and the travel controller 52 as shown in FIG. 4 may be configured by an independent separate controller, or the stabilization controller and the travel controller may be implemented in one control unit. In addition, one computer may execute a program describing the processes to be implemented by the stabilization controller and a program describing the processes to be implemented by the travel controller independently, or by switching them over time. Similarly the abnormal condition detector 58 or the safety mode controller 60 in the control module 14 may be configured by an independent circuit, respectively. Or, the configuration may be such that one same computer comprises and executes a program describing processes to be executed by the abnormal condition detector 58 and a program describing processes to be executed by safe mode controller 60.

The technical elements illustrated in this specification and the drawings shall show the usefulness by themselves or in various combinations, and shall not be limited to the combinations described in the claims when it was filed. In addition, the techniques exemplified in this specification or the drawings can achieve more than one object simultaneously, and shall have technical usefulness by achieving one of the objects.

What is claimed is:

1. A running machine with wheels comprising:
   a body;
   drive wheels coaxially arranged on a common rotation axis located at a predetermined position of the body, wherein the body is tiltable around the common rotation axis;
   a motor for applying torque to the drive wheels;
   a first controller outputting to the motor a first torque command to maintain the tilt angle of the body in a predetermined angle range, wherein the gravity center of the body is higher than the common rotation axis while the tilt angle of the body is maintained in the predetermined angle range;
   a second controller outputting to the motor a second torque command to drive the machine along an intended path;
   an abnormal condition detector for detecting occurrence of an abnormal condition relating to running of the machine; and
   a safe mode controller for preventing the second controller from outputting the second torque command when occurrence of the abnormal condition is detected by the abnormal condition detector.

2. The machine according to claim 1, further comprising:
   a support member being movable up and down with respect to the body, wherein the support member prevents the body from falling down when the support member moves to the down position and is in contact with the ground.

3. The machine according to claim 2, wherein the support member moves to the down position at first speed when occurrence of the abnormal condition is detected and the support member moves to the down position at second speed when the machine stops running, the first speed being faster than the second speed.

4. The machine according to claim 2, wherein the first controller changes the torque command, after the support member moves to the down position, from the first torque command to a third torque command to tilt the body to the direction that the support member approaches the ground.

5. The machine according to claim 1, wherein the abnormal condition detector judges that the abnormal condition has occurred when at least one of the rotating speed of the drive wheels, the tilt angle of the body, and the magnitude of the torque command is out of a predetermined range.

* * * * *